United States Patent
Park et al.

(10) Patent No.: US 8,031,317 B2
(45) Date of Patent: *Oct. 4, 2011

(54) ARRAY SUBSTRATE, METHOD OF MANUFACTURING THE SAME AND DISPLAY APPARATUS HAVING THE SAME

(75) Inventors: Myung-Jae Park, Suwon-si (KR); Hyang-Shik Kong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 189 days.

This patent is subject to a terminal disclaimer.

(21) Appl. No.: 12/427,250

(22) Filed: Apr. 21, 2009

(65) Prior Publication Data

US 2009/0251449 A1 Oct. 8, 2009

Related U.S. Application Data

(63) Continuation of application No. 10/886,530, filed on Jul. 9, 2004, now Pat. No. 7,538,848.

(30) Foreign Application Priority Data

Jul. 15, 2003 (KR) .................................. 2003-48368

(51) Int. Cl.
   *G02F 1/1345* (2006.01)
   *G02F 1/1343* (2006.01)
(52) U.S. Cl. ......... 349/152; 349/151; 349/149; 349/139

(58) Field of Classification Search .................. 349/139
See application file for complete search history.

(56) References Cited

U.S. PATENT DOCUMENTS

| | | | |
|---|---|---|---|
| 5,532,853 A | 7/1996 | Song et al. | |
| 6,734,925 B1 | 5/2004 | Lee et al. | |
| 6,856,374 B1 | 2/2005 | Ozaki et al. | |
| 7,110,057 B2 | 9/2006 | Jeon | |
| 2001/0033254 A1 | 10/2001 | Furusato et al. | |
| 2002/0000555 A1 | 1/2002 | Fujikawa et al. | |
| 2002/0113934 A1 | 8/2002 | Aoki | |
| 2003/0063080 A1 | 4/2003 | Takahashi et al. | |
| 2005/0012873 A1 | 1/2005 | Park et al. | |
| 2005/0030464 A1 | 2/2005 | Wang | |
| 2005/0030465 A1 | 2/2005 | Park et al. | |

FOREIGN PATENT DOCUMENTS

JP  05-150263  6/1993

*Primary Examiner* — Wen-Ying P Chen
(74) *Attorney, Agent, or Firm* — F. Chau & Associates, LLC

(57) ABSTRACT

A first wiring is formed on an array substrate, such that the first wiring has a first protrusion. A second wiring is formed on a different layer from that of the first wiring, such that a portion of the second wiring overlaps with the first protrusion. A protection layer that covers the first and second wirings is formed, such that the protection layer has first and second contact holes that expose the first and second wirings, respectively. Then, a third wiring that electrically connects the first wiring to the second wiring through the first and second contact holes is formed. When electrical connection between the first and second wirings is abnormal, a laser beam is irradiated toward the first protrusion, so that the electrical connection may be repaired.

48 Claims, 10 Drawing Sheets

US 8,031,317 B2

ARRAY SUBSTRATE, METHOD OF MANUFACTURING THE SAME AND DISPLAY APPARATUS HAVING THE SAME

CROSS-REFERENCE TO RELATED APPLICATIONS

This is a continuation application of U.S. application Ser. No. 10/886,530, filed on Jul. 9, 2004 now U.S. Pat. No. 7,538,848, the disclosure of which is incorporated by reference herein in its entirety, and which, in turn, claims foreign priority under 35 U.S.C. §119 to Korean Patent Application No. 2003-48368, filed on Jul. 15, 2003, which is hereby incorporated by reference for all purposes as if fully set forth herein.

BACKGROUND OF THE INVENTION

1. Technical Field

The present disclosure relates to an array substrate, a method of manufacturing the array substrate and a display apparatus having the array substrate. More particularly, the present invention relates to an array substrate of which electrical contact between wirings is repairable, a method of manufacturing the array substrate and a display apparatus having the array substrate.

2. Description of Related Art

Recently, a data driver IC and a gate driver IC (or scan driver IC) have been integrated on a liquid crystal display panel in order to reduce manufacturing cost and to meet market requirement of a narrow bezel. In order to acquire above integration, a scan driver circuit including amorphous silicon thin film transistor (a-Si TFT) needs a simple structure.

FIG. 1 is a diagram illustrating a conventional shift register. The shift register in FIG. 1, for example, may be used for a liquid crystal display apparatus.

Referring to FIG. 1, a scan driver circuit that generates a gate pulse for activating a scan line includes a shift register A unit stage of the shift register includes an S-R latch and an AND gate.

The S-R latch is activated based on a first input signal IN1 that corresponds to an output signal of a previous stage, and the S-R latch is inactivated based on a second input signal IN2 that corresponds to an output signal of a next stage. The AND gate generates a gate pulse (or scan signal) when the S-R latch is activated and clock is high.

In detail, first and second clocks CKV and CKVB applied to each unit stage for driving odd and even numbered scan lines have opposite phase to each other.

The shift register in FIG. 1 may be formed and have a structure shown as in following FIG. 2.

FIG. 2 is a circuit diagram illustrating a unit stage in FIG. 1.

Referring to FIGS. 1 and 2, a unit stage of a shift register includes a buffer section 10, a charging section 20, a driving section 30 and a discharging section 40. The unit stage outputs a gate signal (or scan signal) based on a scan start signal STY or an output signal of a previous stage.

In detail, the buffer section 10 includes a first transistor Q1 that has gate and drain electrodes electrically connected to each other and a source electrode electrically connected to a first node N1. A first input signal IN1 is applied to the gate and drain electrodes of the first transistor Q1.

The charging section 20 includes a capacitor C. A first end of the capacitor C is electrically connected to the first node N1. A second end of the capacitor C is electrically connected to the driving section 30.

The driving section 30 includes a second transistor Q2 and a third transistor Q3. The second transistor Q2 includes a drain electrode that is electrically connected to a clock terminal CK, a gate electrode that is electrically connected to the first node N1, and a source electrode that is electrically connected to the second end of the capacitor and an output terminal OUT. The third transistor Q3 includes a drain electrode that is electrically connected to the source electrode of the second transistor Q2 and the capacitor C, and a source electrode that is electrically connected to a first power voltage terminal VSS.

A first clock CKV or a second clock CKVB of which phase is opposite to the first clock CKV is applied to the clock terminal CK.

The discharging section 40 includes a fourth transistor Q4. The fourth transistor Q4 includes a drain electrode that is electrically connected to the first node N1, a gate electrode that is electrically connected to a gate electrode of the third transistor Q3, and a source electrode that is electrically connected to the first power voltage terminal VSS. A second input signal IN2 is applied to both of the gate terminals of the third and fourth transistors Q3 and Q4.

When the first input signal N1 is high, the capacitor C is electrically charged. When the second input signal IN2 is high, the capacitor C is electrically discharged. Therefore, S-R latch operation is performed.

When the capacitor C is electrically charged, the first or second clock CKV or CKVB that is applied to the clock terminal CK is outputted through the second transistor Q2 that is turned on. Therefore, all switching devices (or a-Si TFTs) that are electrically connected to the output terminal OUT are turned on. When the second input signal IN2 is high, the third transistor Q3 is turned on to pull down a voltage of the output terminal OUT to be equal to a first power voltage of the first power voltage terminal VSS.

Therefore, the first and second clocks CKV and CKVB, preferably, have a high voltage of about 15V in order to turn on the a-Si TFTs, and the first power voltage of the first power voltage terminal VSS preferably has a low voltage of about −7V in order to turn off the a-Si TFTs.

As described above, in order to output scan signal that activates the switching devices formed in a display region, the shift register requires the first clock CKV or the second clock CKVB, and a first power voltage that is applied to the first power voltage terminal VSS.

In order to apply the first or second clock CKV or CKVB and the first power voltage, a plurality of wirings and a plurality of contact regions that connect the wirings to the shift register are required. Additionally, in order to electrically connect transistors Q1, Q2, Q3 and Q4 and capacitor C of the shift register with one another, a plurality of contact regions is formed.

When one of the contact regions is electrically opened, no signal is applied to a scan line that corresponds to the contact region and scan lines disposed below the scan line that corresponds to the contact region to induce defects. Therefore, display quality is deteriorated.

Furthermore, a large current flows through the wirings. Therefore, when the contact region is unstable, the contact region is easily opened. In order to repair such an opening of the contact region, separate wirings for a repair are required.

SUMMARY OF THE INVENTION

The present invention provides an array substrate of which electrical contact between wirings is repairable.

The present invention also provides a method of manufacturing the array substrate.

The present invention still also provides a display apparatus having the array substrate.

In an exemplary array substrate according to the present invention, the array substrate includes a substrate, a first wiring, a second wiring, a protection layer and a third wiring. The first wiring having a first protrusion is formed on the substrate. The second wiring is formed on a different layer from that of the first wiring, such that a portion of the second wiring overlaps with the first protrusion. The protection layer covers the first and second wirings, and the protection layer has first and second contact holes that expose the first and second wirings, respectively. The third wiring electrically connects the first wiring to the second wiring through the first and second contact holes.

In an exemplary method of manufacturing an array substrate according to the present invention, a first wiring is formed on the substrate, such that the first wiring has a first protrusion. A second wiring is formed on a different layer from that of the first wiring, such that a portion of the second wiring overlaps with the first protrusion. A protection layer that covers the first and second wirings is formed, such that the protection layer has first and second contact holes that expose the first and second wirings, respectively. Then, a third wiring that electrically connects the first wiring to the second wiring through the first and second contact holes is formed.

In an exemplary display apparatus according to the present invention, the display apparatus includes an array substrate, a color filter substrate and a liquid crystal layer. The array substrate includes a substrate, a first wiring, a second wiring, a protection layer and a third wiring. The first wiring is formed on the substrate, and the first wiring has a first protrusion. The second wiring is formed on a different layer from that of the first wiring, such that a portion of the second wiring overlaps with the first protrusion. The protection layer covers the first and second wirings, and the protection layer has first and second contact holes that expose the first and second wirings, respectively. The third wiring electrically connects the first wiring to the second wiring through the first and second contact holes. The color filter substrate faces the array substrate, and the liquid crystal layer is interposed between the array substrate and the color filter substrate.

In another exemplary display apparatus according to the present invention, the display apparatus includes first, second and third wirings. The first wiring is disposed over a substrate, and the first wiring is extended in a first direction. The second wiring is disposed over the substrate such that a portion of the second wiring overlaps with the first wiring, and the second wiring is extended in a second direction that is substantially perpendicular to the first direction. The third wiring electrically connects the first wiring to the second wiring through a first contact hole that exposes the first wiring and a second contact hole that exposes the second wiring.

Therefore, when an electrical connection between the first and second wirings through the first contact hole is abnormal, a laser beam is irradiated toward the protrusion or overlapping region of the first and second wirings to electrically connect the first and second wirings. That is, the electrical connection between the first and second wirings may be repaired.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF EMBODIMENTS

Hereinafter the embodiments of the present invention will be described in detail with reference to the accompanied drawings.

Figure 1:
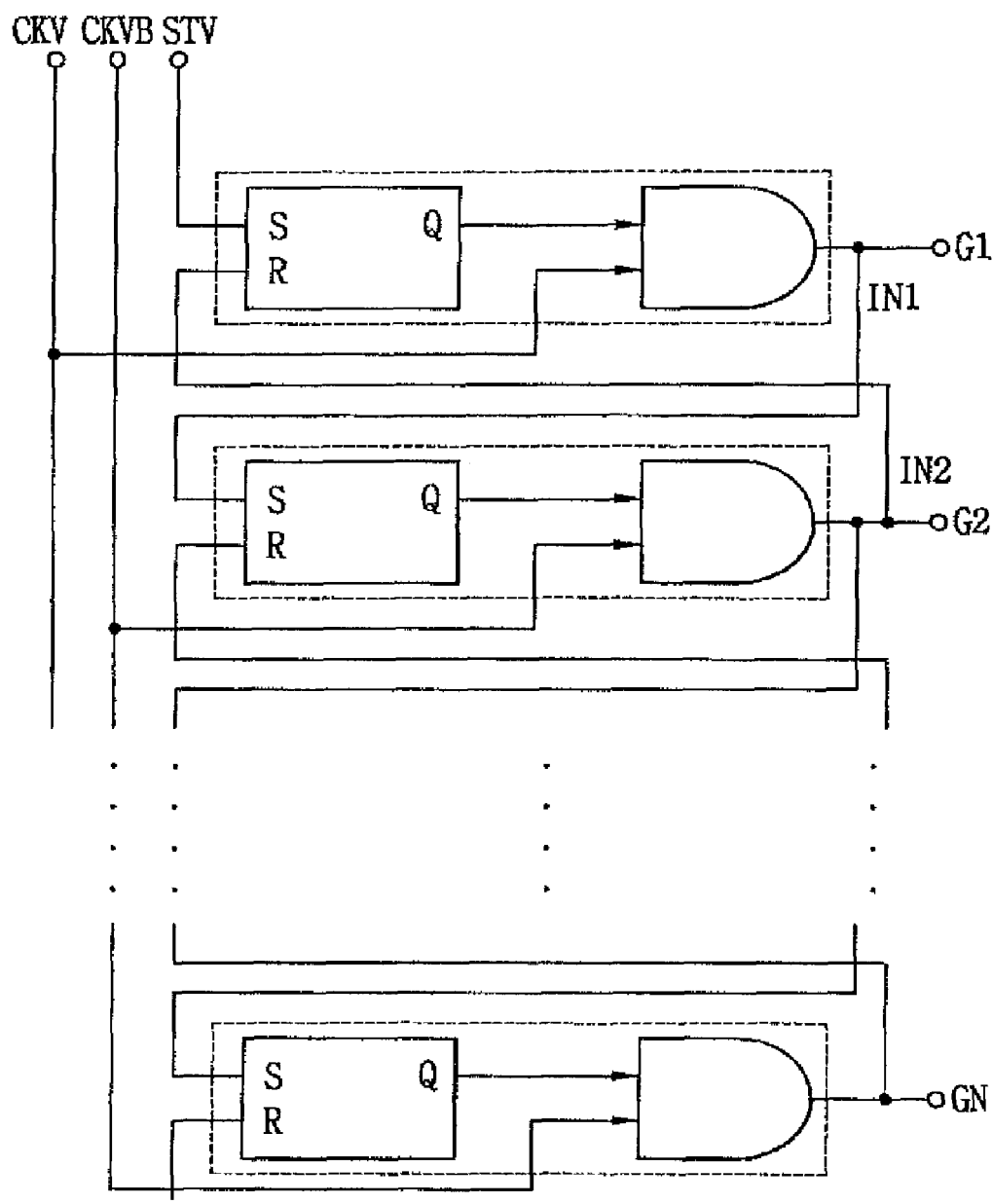
FIG. 1 is a diagram illustrating a conventional shift register.
Figure 2:
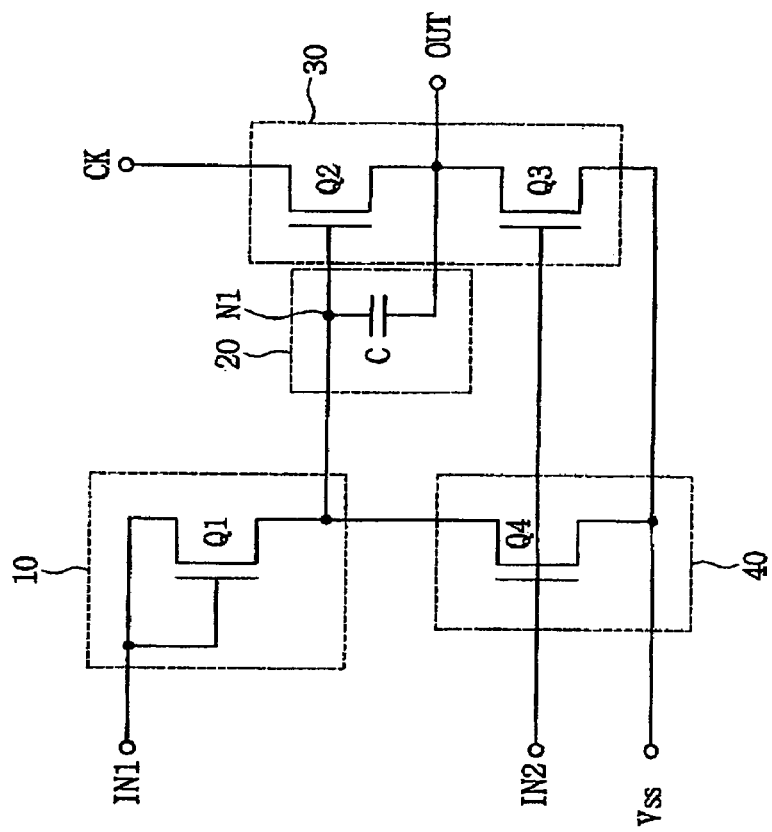
FIG. 2 is a circuit diagram illustrating a unit stage in FIG. 1.
Figure 3:
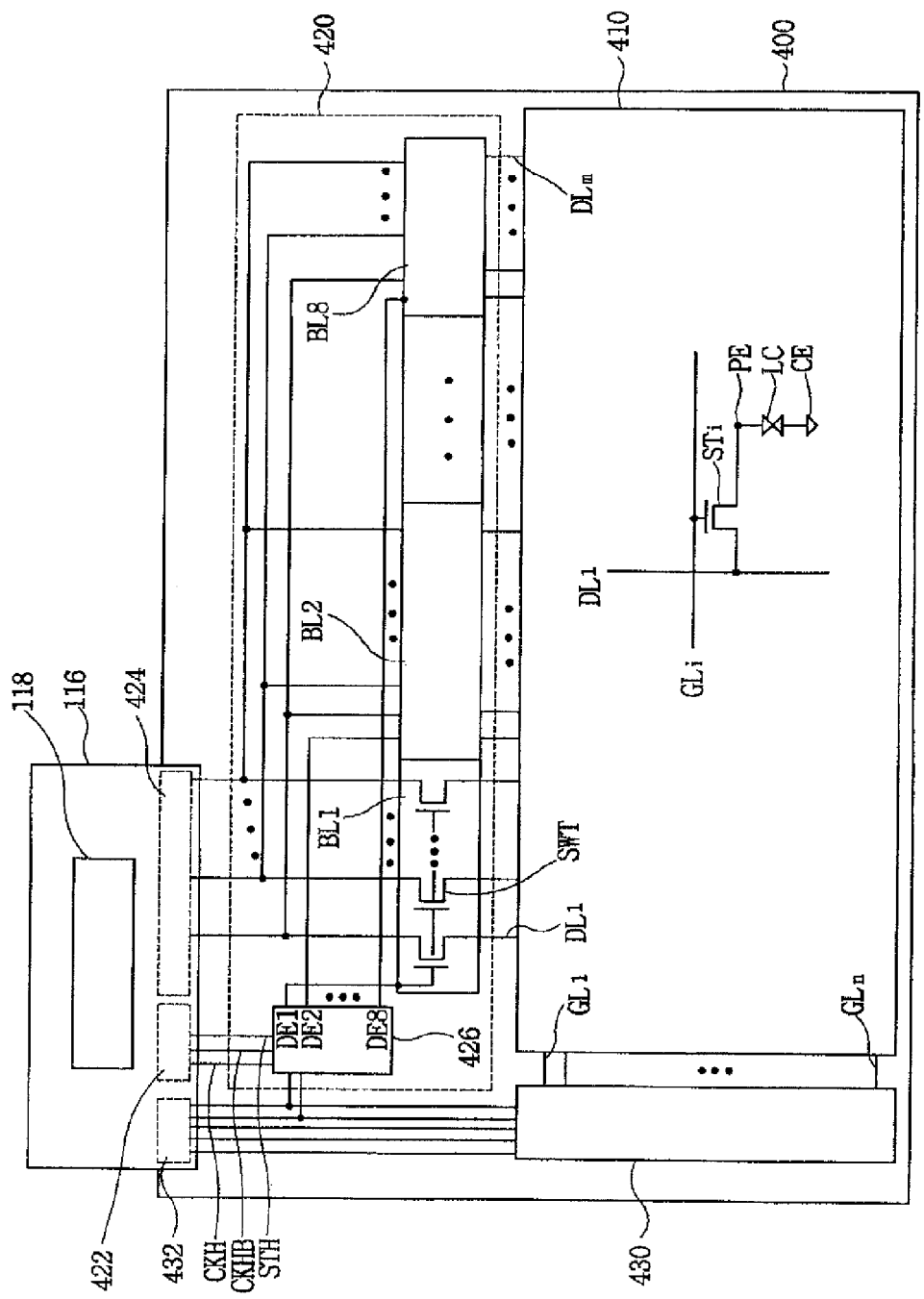
FIG. 3 is a schematic plan view illustrating a liquid crystal display apparatus according to the present invention.

FIG. 3 is a schematic plan view illustrating a liquid crystal display apparatus according to the present invention. The liquid crystal display apparatus in FIG. 3 corresponds to an array substrate of a-Si TFT liquid crystal display apparatus.

Referring to FIG. 3, an array substrate includes a substrate 400, a display cell array circuit 410, a data driver circuit 420, data driver circuit connection pads 422 and 424, a scan driver circuit 430, and a scan driver circuit connection pad 432. The display cell array circuit 410, the data driver circuit 420, the data driver circuit connection pads 422 and 424, the scan driver circuit 430 and the scan driver circuit connection pad 432 are formed on the substrate 400 through a process of manufacturing a TFT. The scan driver circuit 430 corresponds to a shift register.

An integrated control and data driver chip 118 formed on a flexible printed circuit (FPC) 116 is electrically connected to circuits of the substrate 400, which are electrically connected to each other via the FPC 116. Therefore, a data signal, a data timing signal, a gate timing signal and a data driver voltage are applied to the data driver circuit 420 and the scan driver circuit 430 through the FPC 116.

The display cell array circuit 410 includes m-number of data lines DL1 to DLm and n-number of scan lines GL1 to GLn. The data lines DL1 to DLm are extended in a longitudinal direction, and the scan lines GL1 to GLn are extended in a lateral direction.

A switching transistor ST is formed in a region defined by each of the data lines DL1 to DLm and each of the scan lines GL1 to GLn. The switching transistor ST includes a source electrode that is electrically connected to one of the data lines DL1 to DLm, a gate electrode that is electrically connected to one of the scan lines GL1 to GLn, and a drain electrode that is electrically connected to a pixel electrode PE. Liquid crystal LC is interposed between the pixel electrode PE and a common electrode CE formed on a color filter substrate.

When a pixel voltage is applied to the pixel electrode PE, electric fields are formed between the pixel electrode PE and the common electrode CE to adjust arrangement of the liquid crystal LC, thereby controlling an amount of light to display gray scales.

The data driver circuit 420 includes a shift register 426 and n-number of switching transistors SWT. n/8 number of the switching transistors SWT are grouped to form 8 data line blocks BL1 to BL8.

n/8 input terminals of each of the data line blocks BL1 to BL8 are electrically connected to the data driver circuit connection pad 424, and n/8 output terminals of each of the data line blocks BL1 to BL8 are electrically connected to n/8 data lines, respectively. Furthermore, one of 8 output terminals of the shift register 426 is electrically connected to block selecting terminals.

Each of n-number of switching transistors SWT includes an a-Si TFT having a source electrode that is electrically connected to corresponding data line, a drain electrode that is electrically connected to corresponding input terminals of n/8 data input terminals, and a gate electrode that is electrically connected to the block selecting terminal.

Therefore, n-number of data lines are divided into 8 blocks having n/8 data lines. The shift register 426 selects 8 blocks based on a block selection signal in sequence.

The shift register 426 receives a first clock CKH, a second clock CKHB and a block selection start signal STH through the data driver circuit connection pad 422. Output terminals of the shift register 426 are electrically connected to the block selection signal of corresponding line blocks.

Figure 4:
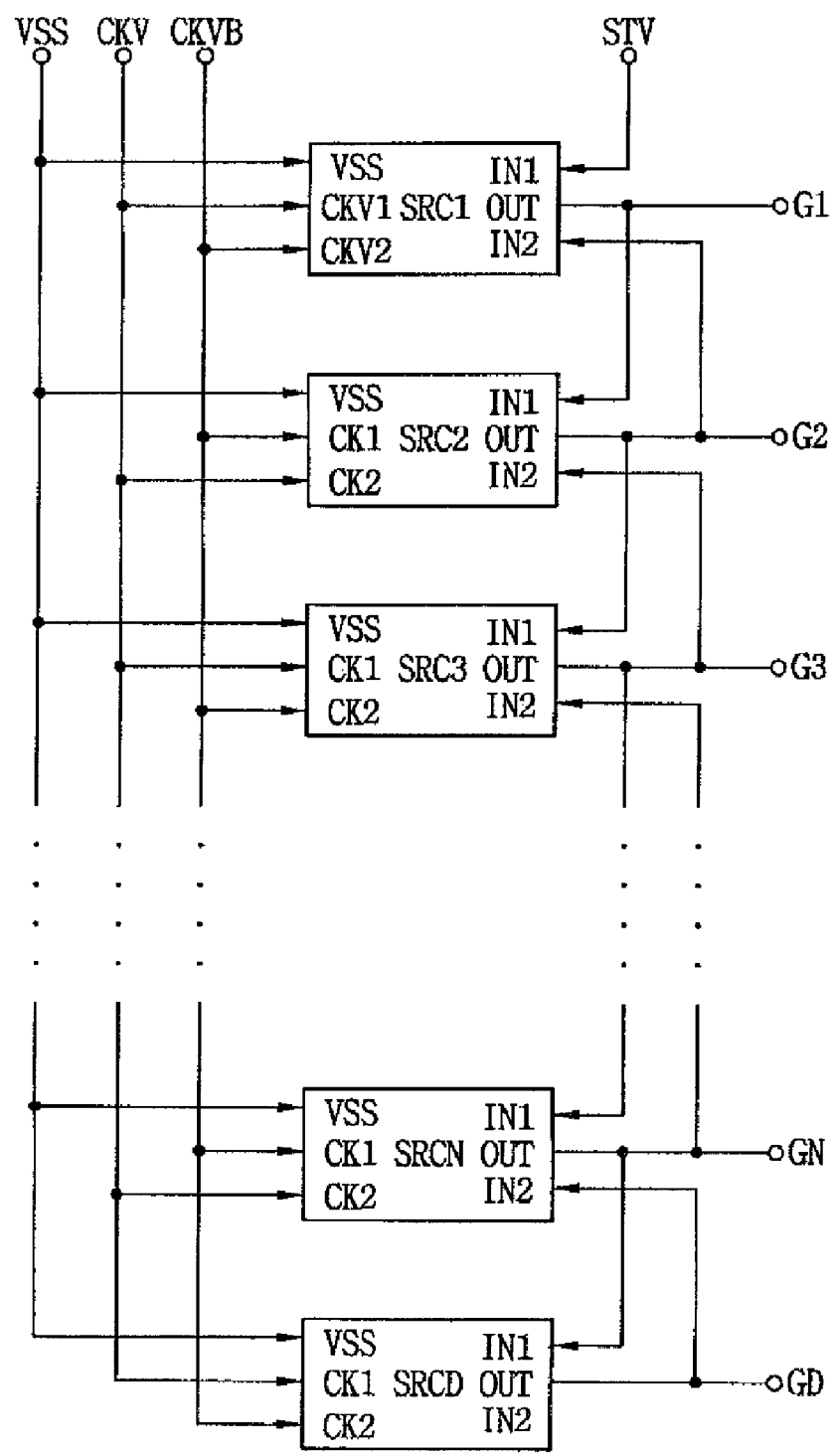
FIG. 4 is a block diagram illustrating a scan driving circuit employing a unit stage in FIG. 3.

FIG. 4 is a block diagram illustrating a scan driving circuit employing a unit stage in FIG. 3. The shift register in FIG. 4 corresponds to a shift register of a scan driver circuit.

Referring to FIG. 4, a scan driver circuit according to the present invention includes a shift register. The shift register includes a plurality of stages SRC1, SRC2, . . . SRCN, SRCD. An output terminal OUT of one stage is electrically connected to a first input terminal IN1 of a next stage. The stages SRC1, SRC2, . . . SRCN correspond to scan lines, and the stage SRCD is a dummy stage. Each stage includes first and second input terminals IN1 and IN2, an output terminal OUT, first and second clock input terminals CKV1 and CKV2, and a first power voltage terminal VSS.

The first stage SRC1 receives a scan start signal STV through the first input terminal IN1. The scan start signal STV is a pulse that is outputted from an external device such as a graphic controller and synchronized with a vertical synchronization signal Vsync.

Output signals of each of the stages SRC1, SRC2, . . . SRCN are applied to each scan line of the array substrate having a plurality of TFTs.

Odd numbered stages SRC1, SRC3, . . . , SRCN-1 receive a first clock CKV through the first clock input terminal CKV1, and the odd numbered stages SRC1, SRC3, . . . , SRCN-1 receive a second clock CKVB through the second clock input terminal CKV2.

Even numbered stages SRC2, SRC4, . . . , SRCN receive the second clock CKVB through the first clock input terminal CKV1, and the even numbered stages SRC2, SRC4, . . . , SRCN receive the first clock CKV through the second clock input terminal CKV2. A phase of the first clock CKV is opposite to a phase of the second clock CKVB. A duty cycle of the first and second clocks CKV and CKVB is about 16.6 ms.

The stages SRC1, SRC2, . . . SRCN receive output signals G2, G3 . . . , GN and GD of the stages SRC2, SRC3, . . . , SRCD as a control signal through the second input terminal IN2, respectively. Therefore, the control signal applied to the second input terminal IN2 is delayed.

Each stage outputs a high signal in sequence to select a scan line.

The last stage SRCN requires a control signal that is to be inputted to the second input terminal IN2, so that the dummy stage SRCD provides the last stage SRCN with the dummy signal GD.

Hereinbefore, a phase of the first clock CKV is opposite to a phase of the second clock CKVB. Alternatively, a phase difference between the first and second clocks CKV and CKVB may be 90° or 270°.

Additionally, hereinbefore, the stages may be grouped into a first group to which the first clock is provided and a second group to which the second clock is provided. Alternatively, the stages may be grouped into equal to or greater than three groups to which equal to or greater than three clocks are applied, respectively.

Figure 5:
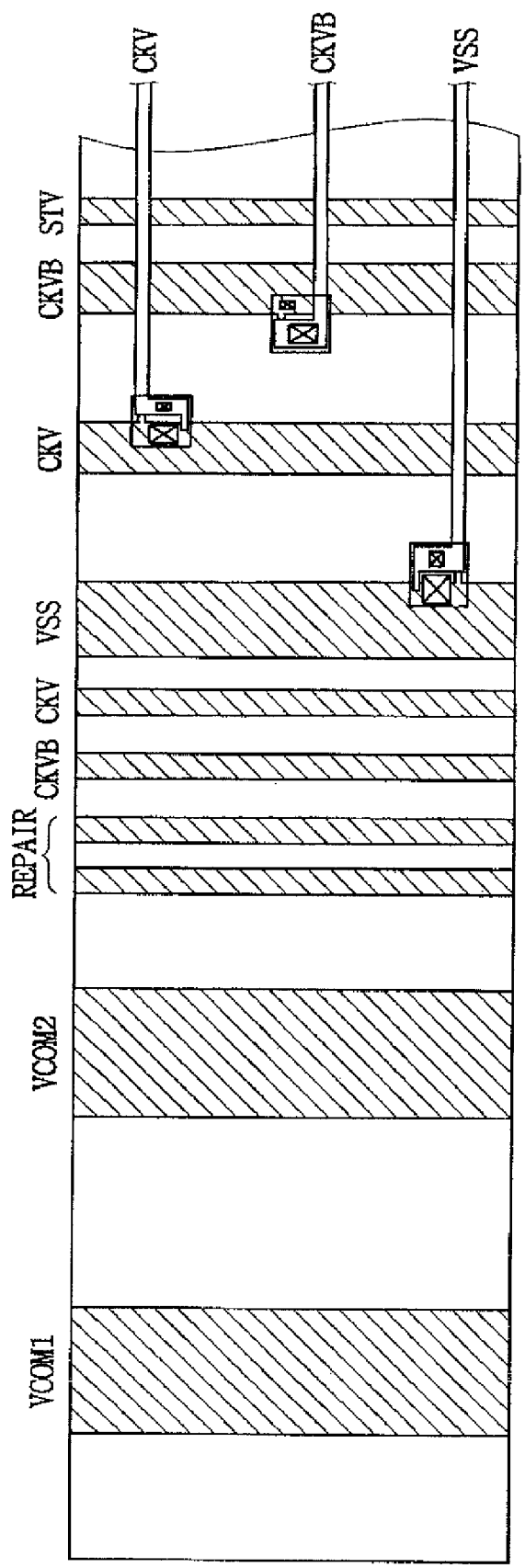
FIG. 5 is a layout illustrating clock wirings for applying clocks to a unit stage of a shift register according to an exemplary embodiment of the present invention.

FIG. 5 is a layout illustrating clock wirings for applying clocks to a unit stage of a shift register according to an exemplary embodiment of the present invention.

Referring to FIG. 5, a plurality of wirings such as a first power voltage wiring VSS1, a first clock wiring CKV1, a second clock wiring CKVB1, a scan start wiring STV, etc., is disposed at outside region of a shift register having a plurality of unit stages, such that the first power voltage wiring VSS1, the first clock wiring CKV1, the second clock wiring CKVB1 and the scan start wiring STV are substantially parallel with each other. The narrower a width of the wirings is, the farther is a distance between the wirings and the shift register.

In detail, the scan start signal wiring STV of which width is the narrowest is adjacent to the shift register, the second and first clock wirings CKVB1 and CKV1 are adjacent to the scan start wiring STV, and the first power voltage wiring VSS1 of which width is the widest is adjacent to the first clock wirings CKV1.

Additionally, a repair wiring REPAIR, a second common voltage wiring VCOM2 and a first common voltage wiring VCOM1 are disposed adjacent to the first power voltage wiring in that order. The repair wiring REPAIR, the second common voltage wiring VCOM2 and the first common voltage wiring VCOM1 are longitudinally and parallelly extended. The repair wiring REPAIR may not be formed in order to reduce an area on which wirings are formed.

In order to compensate RC-delay caused by the first and second clock wirings CKV1 and CKVB1 that are disposed at a right side of the first power voltage wiring VSS1, a third clock wiring CKV2 that transmits the first clock and a fourth clock wiring CKVB2 that transmits the second clock are formed at a left side of the first power voltage wiring VSS1.

In FIG. 5, each of the wirings STV, CKVB1, CKV1, VSS1, CKV, CKVB2, REPAIR, VCOM2 and VCOM1 that are extended in a longitudinal direction is electrically connected to the shift register formed at a right side through connection wirings CKV3, CKVB3 and VSS2 that are extended in a longitudinal direction to provide the shift register with power voltages or clocks.

The wirings STV, CKVB1, CKV1, VSS1, CKV, CKVB2, REPAIR, VCOM2 and VCOM1 and the connection wirings CKV3, CKVB3 and VSS2 are formed on a different layer. Therefore, the wirings STV, CKVB1, CKV1, VSS1, CKV, CKVB2, REPAIR, VCOM2 and VCOM1 are electrically connected to the connection wirings CKV3, CKVB3 and VSS2 through contact holes CNT1, CNT2, CNT3, CNT4, CNT5 and CNT6. A portion of the wirings STV, CKVB1, CKV1, VSS1, CKV, CKVB2, REPAIR, VCOM2 or VCOM1 overlaps with the connection wirings CKV3, CKVB3 and VSS2. Therefore, when one of the contact holes CNT1, CNT2, CNT3, CNT4, CNT5 and CNT6 is electrically opened, a laser beam may be irradiated onto the overlapping portion to electrically connect the wirings STV, CKVB1, CKV1, VSS1, CKV, CKVB2, REPAIR, VCOM2 or VCOM1 to the connection wirings CKV3, CKVB3 and VSS2. Therefore, defects may be repaired.

Then, the first power voltage wiring VSS1 and the connection wiring disposed over the first power voltage wiring VSS1, and overlapping with the first power voltage wiring VSS1, for example, will be explained in detail.

Figure 6:
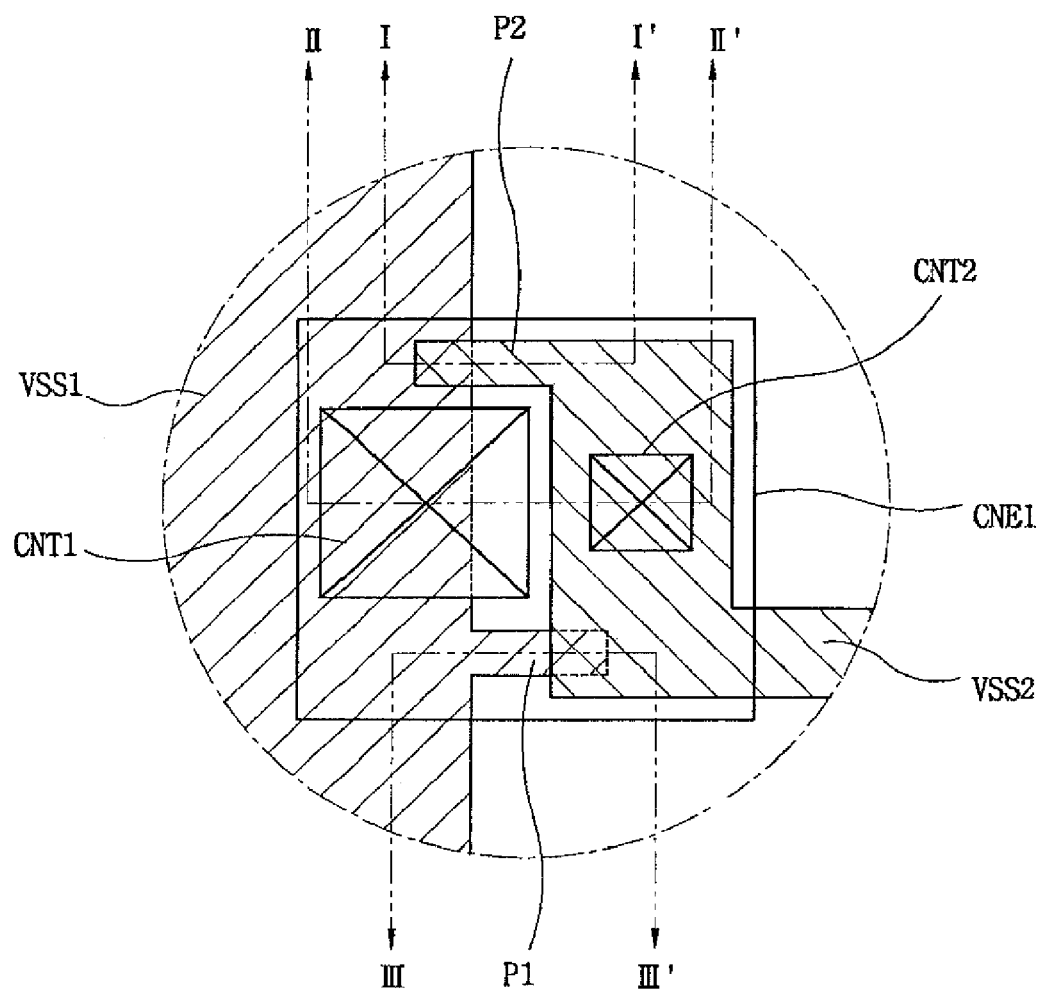
FIG. 6 is an enlarged view of X in FIG. 5.

FIG. 6 is an enlarged view of X in FIG. 5, and FIGS. 7A to 7C are cross-sectional views taken along lines I-I', II-II' and III and III' in FIG. 6, respectively.

Figure 7A:
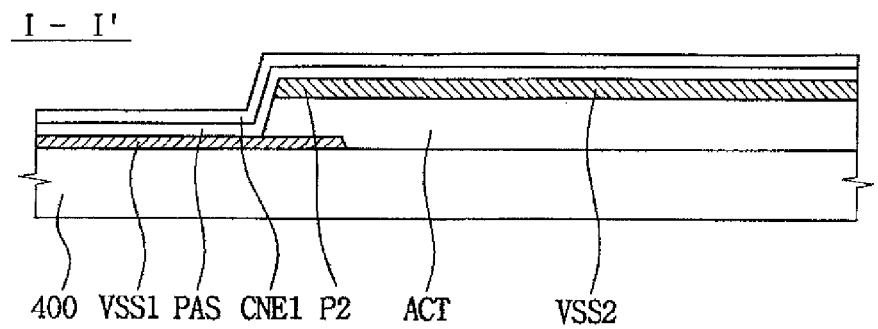
FIGS. 7A to 7C are cross-sectional views taken along lines I-I', II-II' and III and III' in FIG. 6, respectively.
Figure 7B:
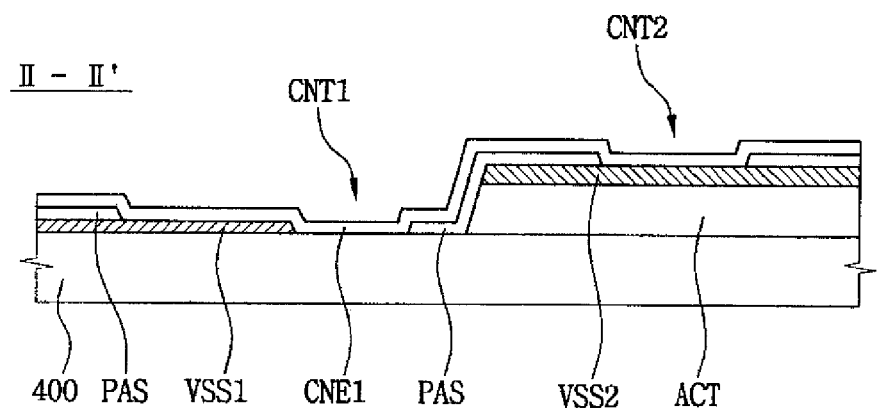
Figure 7C:
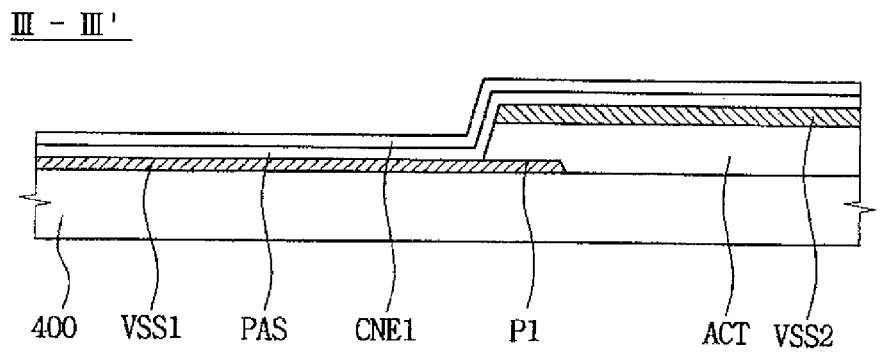

Referring to FIGS. 6 to 7C, a first power voltage wiring VSS1 having a thickness of about 500 angstroms is formed, such that the first power voltage wiring VSS1 is extended in a first direction, for example a longitudinal direction. The first power voltage wiring VSS1 includes a first protrusion P1 formed near a region at which first and second contact holes CNT1 and CNT2 are to be formed. The first power voltage wiring VSS1 is patterned from a same layer as that of a gate wiring and a gate electrode.

Then, an active layer ACT is formed on the first power voltage wiring VSS1, and a first connection wiring VSS2 having a thickness of about 3000 angstroms is formed on the active layer ACT. The second connection wiring VSS2 is extended in a second direction, for example a lateral direction. The first connection wiring VSS2 includes a second protrusion P2 formed near a region at which first and second contact holes CNT1 and CNT2 are to be formed. The second protrusion P2 is opposite to the first protrusion P1 with respect to the first contact hole CNT1. Therefore, when an electrically connection between the first power voltage wiring VSS1 and the first connection wiring VSS2 through the first contact hole CNT1 is abnormal, a position of the first and second protrusions P1 and P2 may be easily detected. The first connection wiring VSS2 is patterned from a same layer as that of a source electrode and a drain electrode.

In FIGS. 6 to 7C, the first power voltage wiring VSS1 and the first connection wiring VSS2 overlap each other two times by the first and second protrusions P1 and P2. However, the first power voltage wiring VSS1 and the first connection wiring VSS2 overlap each other only once by only one protrusion, or the first power voltage wiring VSS1 and the first connection wiring VSS2 overlap each other more than or equal to three times by more than or equal to three protrusions.

The first connection wiring VSS2 may include only one layer. Alternatively, the first connection wiring VS S2 may include a first layer including aluminum (Al) and a second layer including chromium (Cr). The first layer has a thickness of about 2500 angstroms, and the second layer has a thickness of about 500 angstroms. The second layer is disposed on the first layer.

A portion of the active layer ACT, which is disposed under the first connection wiring VSS2, may not be removed. The active layer ACT disposed below the first connection wiring VSS2 functions as a channel layer of the thin film transistor employed by a unit stage of the shift register.

As described above, a portion of the first power voltage wiring VSS1, which is near the first and second contact holes CNT1 and CNT2, is protruded to form the first protrusion P1 in order to overlap with the first connection wiring VSS2. A portion of the first connection wiring VSS2, which is near the first and second contact holes CNT1 and CNT2, is protruded to form the second protrusion P2 in order to overlap with the first power voltage wiring VSS1.

A protection layer PAS covers the first power voltage wiring VSS1 and the first connection wiring VSS2 formed on the substrate 400. However, the protection layer PAS exposes a portion of the first power voltage wiring VSS1, which is near the first contact hole CNT1, and a portion of the first connection wiring VSS2, which is near the second contact hole CNT2.

A first connection electrode CNE1 having a thickness of about 500 angstroms is formed on the protection layer PAS. The first connection electrode CNE1 may include indium tin oxide (ITO), indium zinc oxide (IZO), etc. The first connection electrode CNE1 electrically connects the first power voltage wiring VSS1 and the first connection wiring VSS2 through the first and second contact holes CNT1 and CNT2.

When the first power voltage wiring VSS1 has a thickness of about 500 angstroms, the first connection wiring VSS2 has a thickness of about 3000 angstroms, and the first connection electrode CNE1 has a thickness of about 500 angstroms, reparability is most effective. However, the thickness does not limit the scope of the present invention.

In FIG. 6, an edge of the first power voltage wiring VSS1, which is exposed through the first contact hole CNT1, is straight. However, heats are generated more at an edge region of the first power voltage wiring VSS1 than at a center region of the first power voltage wiring VSS1. Additionally, a contact resistance is higher at the edge region of the first power voltage wiring VSS1 than at the center region of the first power voltage wiring VSS1. Therefore, a contact area is increased as shown in FIG. 8.

Figure 8:
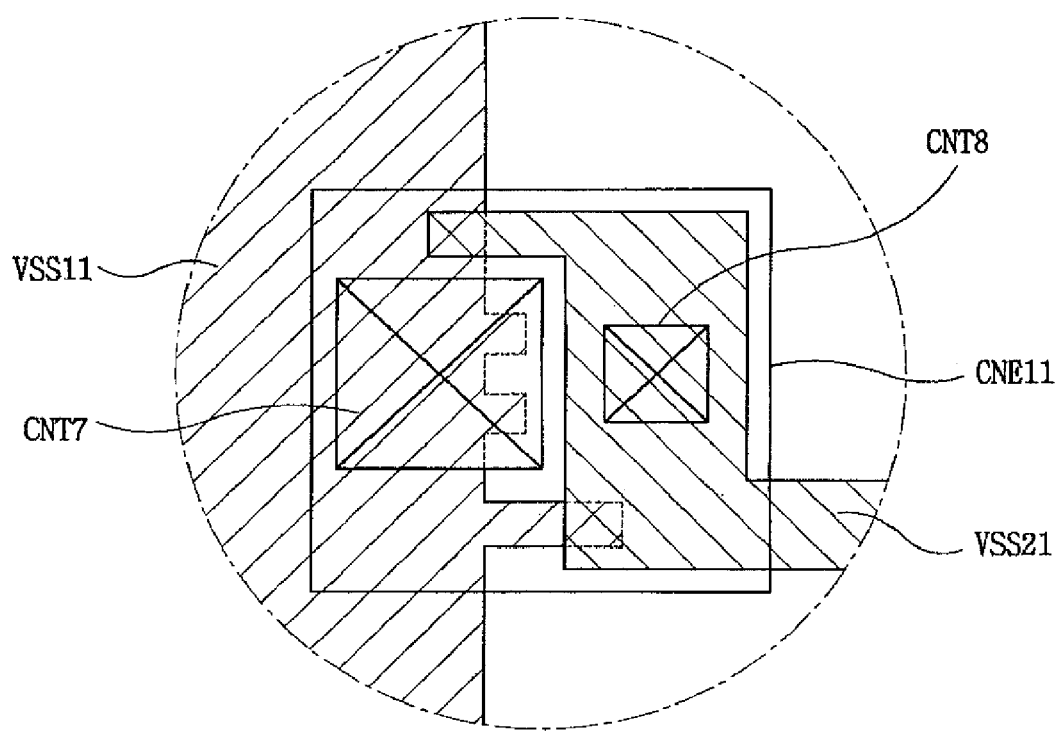
FIG. 8 is an enlarged view illustrating a region near contact hole according to another exemplary embodiment of the present invention.

FIG. 8 is an enlarged view illustrating a region near contact hole according to another exemplary embodiment of the present invention. In the present embodiment, the shape of the region near contact hole according to the present embodiment is same as that of FIG. 6 except for the first power voltage wiring. Thus, any further explanation will be omitted.

Referring to FIG. 8, the first power voltage wiring VSS11 has a uniform width except for a seventh contact hole CNT7. That is, the first power voltage wiring VSS11 has a rugged edge formed in the seventh contact hole CNT7. Therefore, a heat generated from the seventh contact hole CNT7 is reduced by increasing an electrical contact region.

Figure 9:
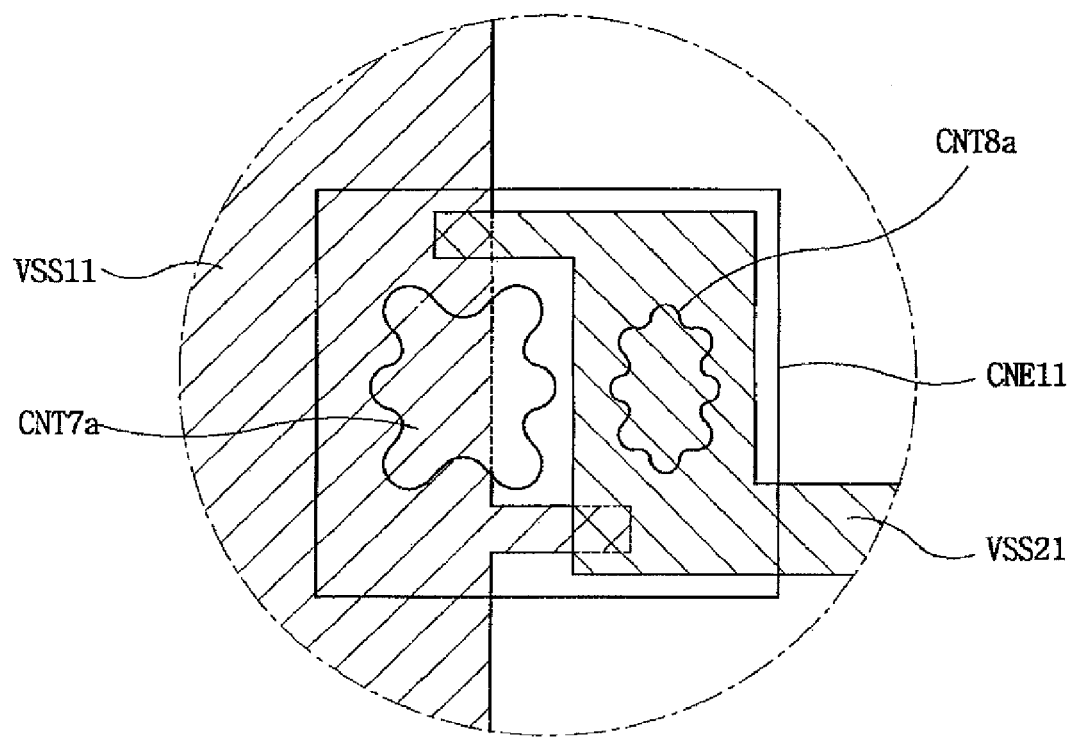
FIG. 9 is an enlarged view illustrating a region near contact hole according to still another exemplary embodiment of the present invention.
Figure 10:
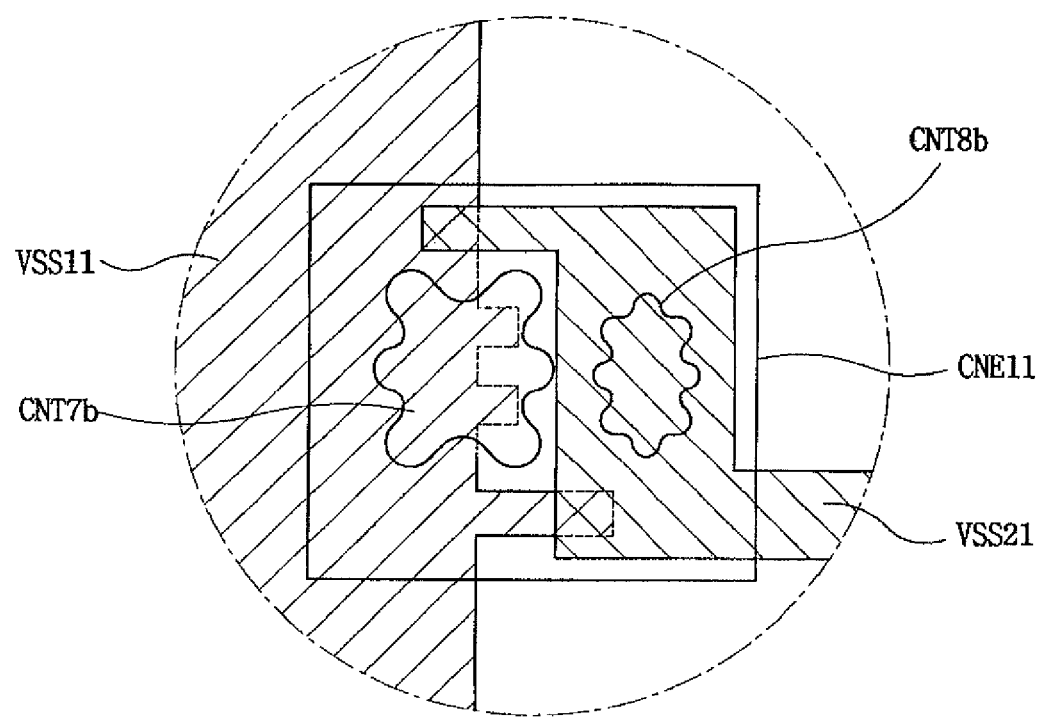
FIG. 10 is an enlarged view illustrating a region near contact hole according to further still another exemplary embodiment of the present invention.

FIG. 9 is an enlarged view illustrating a region near contact hole according to still another exemplary embodiment of the present invention and FIG. 10 is an enlarged view illustrating a region near contact hole according to further still another exemplary embodiment of the present invention.

The inventions of FIGS. 9 and 10 are same as the invention of FIG. 8 except for seventh contact holes CNT7a and CNT7b and eighth contact holes CNT8a and CNT8b. Thus, the same reference numerals will be used to refer to the same or like parts as those described in FIG. 8 and any further explanation will be omitted.

Referring to FIGS. 9 and 10, the seventh contact holes CNT7a and CNT7b and the eight contact holes CNT8a and CNT8b have a contour including concave and convex curves that are disposed alternately. Therefore, a contact resistance in the contact holes may be reduced.

Hereinbefore, a structure of a contact region of the power voltage wiring and the clock wiring has been explained. Alternatively, the structure may be applied to a contact region between TFTs of a unit stage of the shift register.

The structure of the contact region may be applied to a contact region between unit stages of the shift register.

That is, the present invention may be applied to all contact holes that connect a first layer and a second layer disposed on different layer from the first layer.

Having described the exemplary embodiments of the present invention and its advantages, it is noted that various changes, substitutions and alterations can be made herein without departing from the spirit and scope of the invention as defined by appended claims.

What is claimed is:

1. An array substrate comprising:
   a substrate;
   a first wiring extended in a first direction;
   a second wiring extended in a second direction;
   a protection layer covering the first and second wirings, the protection layer having first and second contact holes that expose the first and second wirings, respectively; and
   a third wiring that electrically connects the first wiring to the second wiring through the first and second contact holes,
   wherein the first wiring further comprises a rugged edge, and the rugged edge is formed in the first contact hole.

2. The array substrate of claim 1, wherein a contour of the first contact hole comprises concave and convex curves.

3. The array substrate of claim 2, wherein the substrate comprises a display region including a plurality of scan lines and a plurality of data lines, and a peripheral region including a scan driver circuit that outputs a signal for activating the scan lines, and the first, second and third wirings.

4. The array substrate of claim 3, wherein the scan driver circuit comprises a shift register.

5. The array substrate of claim 3, wherein a first clock is transferred to the scan driver circuit through the first wiring, and a second clock having different phase from that of the first clock is transferred to the scan driver circuit through the second wiring.

6. The array substrate of claim 3, wherein the data lines are extended in the first direction and the scan lines are extended in the second direction.

7. The array substrate of claim 1, wherein the substrate comprises a display region including a plurality of scan lines and a plurality of data lines, and a peripheral region including a scan driver circuit that outputs a signal for activating the scan lines, and the first, second and third wirings.

8. The array substrate of claim 7, wherein the scan driver circuit comprises a shift register.

9. The array substrate of claim 7, wherein a first clock is transferred to the scan driver circuit through the first wiring, and a second clock having different phase from that of the first clock is transferred to the scan driver circuit through the second wiring.

10. The array substrate of claim 7, wherein the data lines are extended in the first direction and the scan lines are extended in the second direction.

11. An array substrate comprising:
    a substrate;
    a first wiring extended in a first direction;
    a second wiring extended in a second direction;
    a protection layer covering the first and second wirings, the protection layer having first and second contact holes that expose the first and second wirings, respectively; and
    a third wiring that electrically connects the first wiring to the second wiring through the first and second contact holes,
    wherein at least one contour of the first contact hole or the second contact hole comprises concave and convex curves.

12. The array substrate of claim 11, wherein the first wiring further comprises a rugged edge, and the rugged edge is formed in the first contact hole.

13. The array substrate of claim 12, wherein the substrate comprises a display region including a plurality of scan lines and a plurality of data lines, and a peripheral region including a scan driver circuit that outputs a signal for activating the scan lines, and the first, second and third wirings.

14. The array substrate of claim 13, wherein the scan driver circuit comprises a shift register.

15. The array substrate of claim 13, wherein a first clock is transferred to the scan driver circuit through the first wiring, and a second clock having different phase from that of the first clock is transferred to the scan driver circuit through the second wiring.

16. The array substrate of claim 13, wherein the data lines are extended in the first direction and the scan lines are extended in the second direction.

17. The array substrate of claim 11, wherein the substrate comprises a display region including a plurality of scan lines and a plurality of data lines, and a peripheral region including a scan driver circuit that outputs a signal for activating the scan lines, and the first, second and third wirings.

18. The array substrate of claim 17, wherein the scan driver circuit comprises a shift register.

19. The array substrate of claim 17, wherein a first clock is transferred to the scan driver circuit through the first wiring, and a second clock having different phase from that of the first clock is transferred to the scan driver circuit through the second wiring.

20. The array substrate of claim 17, wherein the data lines are extended in the first direction and the scan lines are extended in the second direction.

21. A scan driver circuit in an array substrate comprising:
    a substrate;
    a first wiring extended in a first direction;
    a second wiring extended in a second direction;
    a protection layer covering the first and second wirings, the protection layer having first and second contact holes that expose the first and second wirings, respectively; and
    a third wiring that electrically connects the first wiring to the second wiring through the first and second contact holes,
    wherein the first wiring further comprises a rugged edge, and the rugged edge is formed in the first contact hole.

22. The array substrate of claim 21, wherein a contour of the first contact hole comprises concave and convex curves.

23. The array substrate of claim 22, wherein the first wiring and the second wiring are formed in different layers.

24. The array substrate of claim 23, wherein the first wiring and the second wiring are substantially perpendicular to each other.

25. The array substrate of claim 21, wherein the first wiring and the second wiring are formed in different layers.

26. The array substrate of claim 25, wherein the first wiring and the second wiring are substantially perpendicular each other.

27. A scan driver circuit in an array substrate comprising:
    a substrate;
    a first wiring extended in a first direction;
    a second wiring extended in a second direction;
    a protection layer covering the first and second wirings, the protection layer having first and second contact holes that expose the first and second wirings, respectively; and a third wiring that electrically connects the first wiring to the second wiring through the first and second contact holes,
wherein at least one contour of the first contact hole or the second contact hole comprises concave and convex curves.

28. The array substrate of claim 27, wherein the first wiring further comprises a rugged edge and the rugged edge is formed in the first contact hole.

29. The array substrate of claim 28, wherein the first wiring and the second wiring are formed in different layers.

30. The array substrate of claim 29, wherein the first wiring and the second wiring are substantially perpendicular to each other.

31. The array substrate of claim 27, wherein the first wiring and the second wiring are formed in different layers.

32. The array substrate of claim 31, wherein the first wiring and the second wiring are substantially perpendicular to each other.

33. An array substrate comprising:
a substrate;
a first wiring extended in a first direction;
a second wiring extended in a second direction;
a protection layer covering the first and second wirings, the protection layer having first and second contact holes that expose the first and second wirings, respectively; and
a third wiring that electrically connects the first wiring to the second wiring through the first and second contact holes,
wherein contours of the first contact hole and the second contact hole comprise concave and convex curves.

34. The array substrate of claim 33, wherein the first wiring further comprises a rugged edge, and the rugged edge is formed in the first contact hole.

35. The array substrate of claim 34, wherein the substrate comprises a display region including a plurality of scan lines and a plurality of data lines, and a peripheral region including a scan driver circuit that outputs a signal for activating the scan lines, and the first, second and third wirings.

36. The array substrate of claim 35, wherein the scan driver circuit comprises a shift register.

37. The array substrate of claim 35, wherein a first clock is transferred to the scan driver circuit through the first wiring, and a second clock having different phase from that of the first clock is transferred to the scan driver circuit through the second wiring.

38. The array substrate of claim 35, wherein the data lines are extended in the first direction and the scan lines are extended in the second direction.

39. The array substrate of claim 33, wherein the substrate comprises a display region including a plurality of scan lines and a plurality of data lines, and a peripheral region including a scan driver circuit that outputs a signal for activating the scan lines, and the first second and third wirings.

40. The array substrate of claim 39, wherein the scan driver circuit comprises a shift register.

41. The array substrate of claim 39, wherein a first clock is transferred to the scan driver circuit through the first wiring, and a second clock having different phase from that of the first clock is transferred to the scan driver circuit through the second wiring.

42. The array substrate of claim 39, wherein the data lines are extended in the first direction and the scan lines are extended in the second direction.

43. A scan driver circuit in an array substrate comprising:
a substrate;
a first wiring extended in a first direction;
a second wiring extended in a second direction;
a protection layer covering the first and second wirings, the protection layer having first and second contact holes that expose the first and second wirings, respectively; and
a third wiring that electrically connects the first wiring to the second wiring through the first and second contact holes,
wherein contours of the first contact hole and the second contact hole comprise concave and convex curves.

44. The array substrate of claim 43, wherein the first wiring further comprises a rugged edge and the rugged edge is formed in the first contact hole.

45. The array substrate of claim 44, wherein the first wiring and the second wiring are formed in different layers.

46. The array substrate of claim 45, wherein the first wiring and the second wiring are substantially perpendicular to each other.

47. The array substrate of claim 43, wherein the first wiring and the second wiring are formed in different layers.

48. The array substrate of claim 47, wherein the first wiring and the second wiring are substantially perpendicular to each other.

* * * * *